United States Patent
Lee et al.

(10) Patent No.: US 9,575,251 B1
(45) Date of Patent: Feb. 21, 2017

(54) OPTICAL MODE CONVERTER HAVING MULTIPLE REGIONS

(71) Applicant: Oracle International Corporation, Redwood City, CA (US)

(72) Inventors: Jin-Hyoung Lee, San Diego, CA (US); Ivan Shubin, San Diego, CA (US); Xuezhe Zheng, San Diego, CA (US); Ashok V. Krishnamoorthy, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/823,954

(22) Filed: Aug. 11, 2015

(51) Int. Cl.
  *G02B 6/12* (2006.01)
  *G02B 6/14* (2006.01)
  *G02B 6/122* (2006.01)

(52) U.S. Cl.
  CPC .............. *G02B 6/14* (2013.01); *G02B 6/1228* (2013.01)

(58) Field of Classification Search
  None
  See application file for complete search history.

(56) References Cited

U.S. PATENT DOCUMENTS

| | | | | |
|---|---|---|---|---|
| 7,035,509 B2* | 4/2006 | Payne | ................. | G02B 6/1228 385/129 |
| 2005/0041902 A1* | 2/2005 | Frigo | ................. | G01M 11/088 385/1 |
| 2015/0055912 A1* | 2/2015 | Kachru | ................. | G02B 6/136 385/14 |

* cited by examiner

*Primary Examiner* — Chad Smith
(74) *Attorney, Agent, or Firm* — Park, Vaughan, Fleming & Dowler LLP (57) ABSTRACT

A standard-CMOS-process-compatible optical mode converter transitions an optical mode size using a series of adjacent regions having different optical mode sizes. In particular, in a partial-slab-mode region, which is adjacent to an initial rib-optical-waveguide-mode region, a width of a slab portion of the rib-type optical waveguide decreases and a width of a rib portion of the rib-type optical waveguide decreases to a first minimum tip size. Then, in a slab-mode region, which is adjacent to the partial-slab-mode region, the width of the slab portion decreases to a second minimum tip size. In addition, a dielectric layer is disposed over the slab portion, the rib portion and the BOX layer in the partial-slab-mode region, the slab portion and the BOX layer in the slab-mode region, and the BOX layer in a released-mode region that is adjacent to the slab-mode region and that does not include the semiconductor layer.

20 Claims, 8 Drawing Sheets

OPTICAL MODE CONVERTER HAVING MULTIPLE REGIONS

GOVERNMENT LICENSE RIGHTS

This invention was made with U.S. Government support under Agreement No. HR0011-08-9-0001 awarded by DARPA. The U.S. Government has certain rights in the invention.

BACKGROUND

Field

The present disclosure generally relates to an optical mode converter for an optical interface. More specifically, the present disclosure relates to an optical mode converter for an optical interface that includes an inverse taper with multiple mode regions and an increased minimum tip size.

Related Art

Silicon photonics is a promising technology that can provide large communication bandwidth, large density, low latency and low power consumption for inter-chip and intra-chip connections. In the last few years, significant progress has been made in developing low-cost components for use in inter-chip and intra-chip silicon-photonic connections, including: high-bandwidth efficient silicon modulators, low-loss optical waveguides, wavelength-division-multiplexing (WDM) components, and high-speed CMOS optical-waveguide photo-detectors. Because of technical advances in CMOS processes, many of these components are now available in a commercial CMOS foundry, which may facilitate mass-volume production and, therefore, cost-effective inter-chip and intra-chip interconnects.

In order to enable dense integration, the optical mode in a silicon optical waveguide is typically sub-micron in size. However, when the optical waveguide is used to transfer data in and out from a silicon photonics chip (i.e., to optically couple light in or out from the silicon photonics chip), it usually suffers from significant optical coupling loss because of a huge optical mode size mismatch with external devices, such as an optical fiber (which has an optical mode size of around 10 µm) or a III-V optical gain chip (which has an optical mode size of around 1-3 µm). This severe optical coupling loss adversely affects the energy efficiency of the overall optical link and system.

In order to address this problem, different types of optical mode converters have been implemented in a submicron silicon-on-insulator (SOI) platform. For example, a surface-normal grating coupler has been widely adopted for versatile optical input/output (I/O) because of its excellent CMOS compatibility and wafer-level processing. However, surface-normal grating couplers also exhibit drawbacks, such as a relatively narrow bandwidth (typically 30 nm), polarization dependence, and strong back-reflection. For a specific application such as hybrid silicon-III-V laser integration, an optical interface with broadband, ultra-low coupling loss and low back-reflection is often very critical. Consequently, a surface-normal grating coupler is usually not suitable for these applications.

An optical mode converter is another widely used component in an optical interface between a silicon photonics chip and an optical fiber or other external device that has an expanded mode size. Typically, an optical mode converter on an SOI platform includes a silicon inverse taper and a dielectric (or a polymer) overcladding-type optical waveguide. A silicon inverse taper in conjunction with an overcladding dielectric waveguide has been successfully implemented to convert a submicron optical waveguide mode into an optical mode of a few microns with a very low loss.

In particular, an optical mode converter typically has very low loss because of the optical mode transition enabled by the adiabatic inverse taper with a tip size of approximately 60-80 nm. However, the widely used krypton-fluoride deep-ultraviolet lithography in foundries is currently targeting feature sizes or critical dimensions of around 100-250 nm and argon-fluoride deep-ultraviolet lithography is currently targeting feature sizes or critical dimensions of around 100 nm. Therefore, a 60-80 nm silicon inverse-taper tip size is clearly a challenge for processing using standard CMOS processes. Indeed, most of the existing optical mode converters were fabricated using low-throughput electron-beam lithography. While the current most-advanced CMOS process line with argon-fluoride immersion lithography is capable of feature sizes or critical dimensions of around 20-45 nm, such processing is not widely available and, therefore, may significantly increase the cost of optical mode converters and silicon photonics chips that include the optical mode converters.

Hence, what is needed is an optical mode converter that does not suffer from the above-described problems.

SUMMARY

One embodiment of the present disclosure provides an integrated circuit that includes: a substrate; a buried-oxide (BOX) layer disposed on the substrate; and a semiconductor layer disposed on the BOX layer. Moreover, in a rib-optical-waveguide-mode region, an optical waveguide is defined by a rib portion in the semiconductor layer having a width along a direction transverse to a symmetry axis of the optical waveguide and a slab portion in the semiconductor layer having a width also along the direction transverse to the symmetry axis. Furthermore, the integrated circuit includes an optical mode converter that includes: a partial-slab-mode region, adjacent to the rib-optical-waveguide-mode region, in which the width of the slab portion decreases and the width of the rib portion decreases to a first minimum tip size; and a slab-mode region, adjacent to the partial-slab-mode region and that excludes the rib portion, in which the width of the slab portion decreases to a second minimum tip size. Additionally, a dielectric layer is disposed on the substrate, where the dielectric layer is disposed over the rib portion, the slab portion and the BOX layer in the partial-slab-mode region, the slab portion and the BOX layer in the slab-mode region, and the BOX layer in a released-mode region adjacent to the slab-mode region and that excludes the semiconductor layer.

Moreover, the optical waveguide may exclude a channel-type optical waveguide in the rib-optical-waveguide-mode region.

Furthermore, the first minimum tip size may be greater than 180 nm and/or the second minimum tip size may be greater than 180 nm.

Additionally, the dielectric layer may include: silicon dioxide, silicon oxynitride, silicon nitride, and/or a polymer.

In some embodiments, lengths of the partial-slab-mode region and the slab-mode region are an order of magnitude greater than the width of the slab portion and the width of the rib portion.

Note that a thickness of the dielectric layer may be based on a desired mode size of the optical mode converter.

Moreover, the optical mode converter may be defined in the integrated circuit prior to metallization and dielectric-stacking fabrication operations. Alternatively, the optical mode converter may be defined in the integrated circuit after metallization and dielectric-stacking fabrication operations.

Furthermore, the integrated circuit may include a dielectric stack with a metal layer as a built-in mask adjacent to the dielectric layer along the direction.

Another embodiment provides a system that includes: a processor; a memory, coupled to the processor, which stores a program module; and the integrated circuit. During operation, the program module may be executed by the processor.

Another embodiment provides a method for converting an optical spot size of an optical signal, which may be performed by the optical mode converter.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an optical mode converter, an integrated circuit that includes the optical mode converter, a system that includes the integrated circuit, and a technique for converting an optical spot size of an optical signal are described. The optical mode converter includes a silicon inverse-taper structure that is compatible with standard CMOS processes. In particular, the optical mode converter transitions an optical mode size from a rib-type optical waveguide in a rib-optical-waveguide-mode region using a series of adjacent regions having different optical mode sizes. In a partial-slab-mode region, which is adjacent to the rib-optical-waveguide-mode region, a width of a slab portion of the rib-type optical waveguide decreases and a width of a rib portion of the rib-type optical waveguide decreases to a first minimum tip size. Then, in a slab-mode region, which is adjacent to the partial-slab-mode region and does not include the rib portion, a width of the slab portion decreases to a second minimum tip size. In addition, a dielectric layer is disposed over the rib portion, the slab portion and the BOX layer in the partial-slab-mode region, the slab portion and the BOX layer in the slab-mode region, and the BOX layer in a released-mode region, which is adjacent to the slab-mode region and does not include the semiconductor layer.

By progressively changing the optical mode size, the minimum feature sizes in the optical mode converter may be compatible with standard CMOS processes, and in particular the current feature size or critical dimension of existing CMOS processes. Consequently, this optical mode conversion technique may increase the yield and reduce the cost of optical mode converters and silicon photonics chips that include the optical mode converters.

Figure 1:
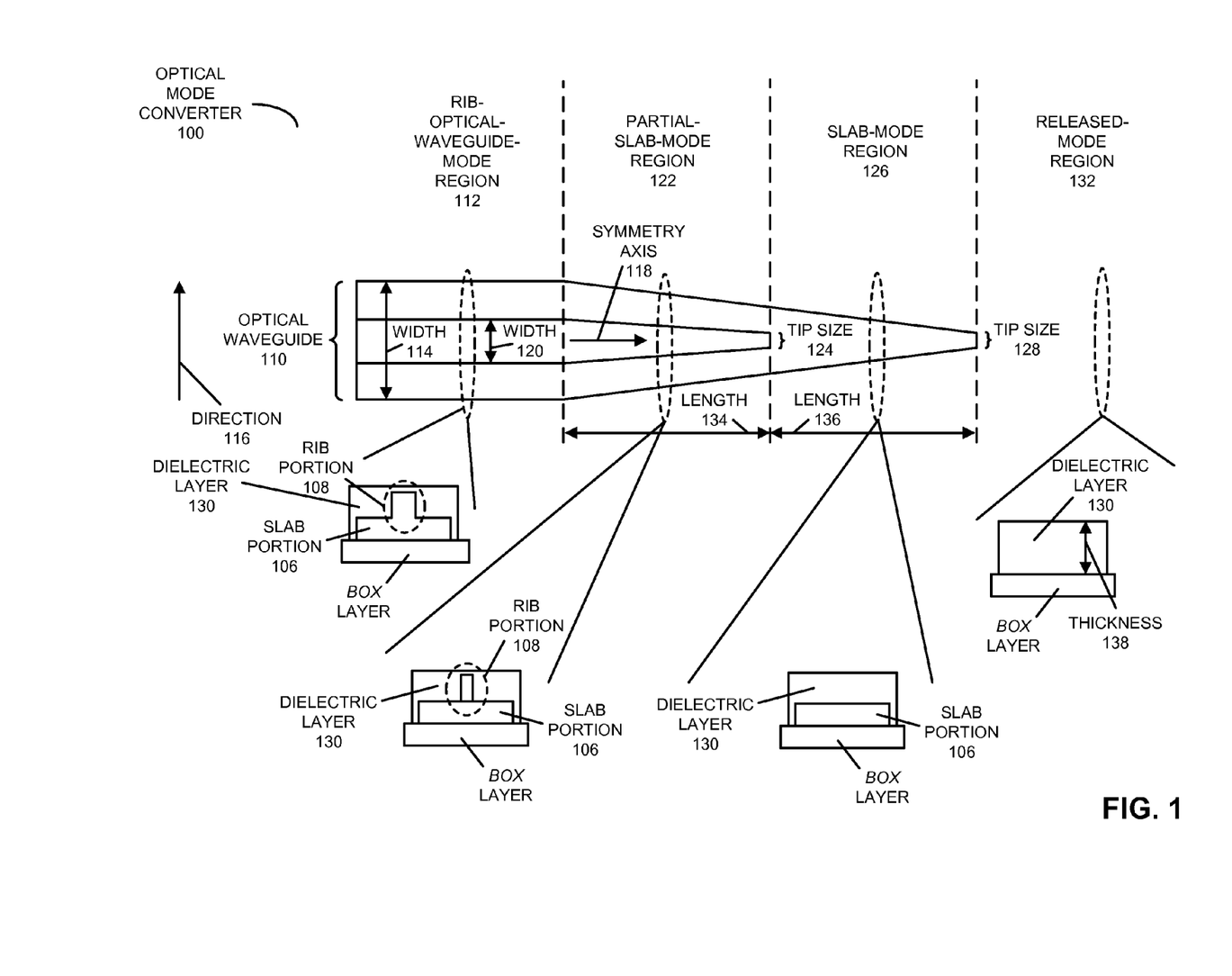
FIG. 1 is a block diagram illustrating an optical mode converter in accordance with an embodiment of the present disclosure.

We now describe embodiments of the optical mode converter. FIG. 1 presents a block diagram illustrating an optical mode converter 100 (such as an optical spot-size converter). This optical mode converter includes an optical waveguide 110 defined in a semiconductor layer disposed on a buried-oxide (BOX) layer, which in turn is disposed on a substrate. (As described further below with reference to FIG. 6, the semiconductor layer may be included in a silicon-on-insulator or SOI technology or platform.) Note that in optical waveguide 110 an optical signal or light is highly confined because of the big difference between the index of refraction of the semiconductor layer and the surrounding material. For example, the BOX layer may prevent optical leakage through the bottom substrate.

In a rib-optical-waveguide-mode region 112, optical waveguide 110 is defined by a slab portion 106 in the semiconductor layer having a width 114 along a direction 116 transverse to a symmetry axis 118 of optical waveguide 110 and a rib portion 108 in the semiconductor layer having a width 120 also along direction 116. Thus, in rib-optical-waveguide-mode region 112, optical waveguide 110 may be a rib-type optical waveguide. Moreover, optical waveguide 110 may exclude a channel-type optical waveguide (in which widths 114 and 120 would be the same).

Furthermore, optical mode converter 100 includes: a partial-slab-mode region 122, adjacent to rib-optical-waveguide-mode region 112, in which width 114 of slab portion 106 decreases (which is sometimes referred to as a 'slab taper') and width 120 of rib portion 108 decreases to a minimum tip size 124 (which is sometimes referred to as an 'SOI taper'); and a slab-mode region 126, adjacent to partial-slab-mode region 122 and that excludes rib portion 108, in which width 114 of slab portion 106 decreases to a minimum tip size 128. Additionally, a dielectric layer 130 (such as silicon dioxide, silicon oxynitride, silicon nitride, and/or a polymer) is disposed over slab portion 106, rib portion 108 and the BOX layer in partial-slab-mode region 122, slab portion 106 and the BOX layer in slab-mode region 126, and the BOX layer in a released-mode region 132 adjacent to slab-mode region 126 and that excludes slab portion 106 and rib portion 108 (i.e., that excludes the semiconductor layer).

In an exemplary embodiment, minimum tip size 124 is greater than 180 nm and/or minimum tip size 128 is greater than 180 nm. Moreover, width 114 in rib-optical-waveguide-mode region 112 may be 1 µm and/or width 120 in rib-optical-waveguide-mode region 112 may be 390 nm. Furthermore, length 134 of partial-slab-mode region 122 and length 136 of slab-mode region 126 may be an order of magnitude greater than widths 114 and 120. For example, length 134 may be 100-300 µm and the minimum tip size 124 may be 180 nm, and length 136 may be 100-300 µm and the minimum tip size 128 may be 180 nm. Note that a thickness 138 of dielectric layer 130 may be based on a desired mode size of optical mode converter 100. For example, a thickness of the dielectric layer 130 can be designed to be 2-3 µm for coupling to a typical lensed optical fiber or III-V semiconductor-waveguide laser/amplifier chip and 5-10 µm for a single-mode optical fiber.

Thus, optical mode converter 100 squeezes the optical mode out of rib portion 108 into the slab (or slab portion 106) and then into an overlay optical waveguide in dielectric layer 130. Moreover, by using a three-mode-size transitions with four different modes (in adjacent regions: rib-optical-waveguide-mode region 112, partial-slab-mode region 122, slab-mode region 126 and released-mode region 132), the minimum feature sizes or critical dimensions (i.e., minimum tip size 124 and minimum tip size 128 of the inverse tapers) of optical mode converter 100 are relaxed so that they are compatible with standard CMOS processing (e.g., a 100-200 nm feature size in deep-ultraviolet lithography). Note that the first transition is from an original or initial rib-type optical waveguide into an SOI taper section with the slab (or slab portion 106) intact which promotes a smooth mode transition from the original rib-type optical waveguide mode into the slab mode. Moreover, the second transition occurs at the SOI taper tip (i.e., at minimum tip size 124) where the mode becomes a complete slab mode. Furthermore, the third transition occurs as the slab (or slab portion 106) is completely tapered to its tip (i.e., to minimum tip size 128) to fully 'release' the mode into the dielectric optical waveguide. In addition, note that the slab in optical mode converter 100 may be extended to the end of the taper structure so that a channel-to-rib converter may not be needed.

We now describe numerical simulations of the optical coupling loss (i.e., the mode-conversion loss) associated with the inverse-taper structure in optical mode converter 100. In these simulations, in rib-optical-waveguide-mode region 112, optical waveguide 110 was a silicon rib-type optical waveguide with a 300 nm thick, 500 nm wide rib portion 108 (for single-mode operation) and an 80 nm thick slab portion 106. Rib portion 108 was inversely tapered down from an original width 120 of 390 nm to minimum tip size 124. Slab portion 106 was also tapered down to minimum tip size 128. In order to determine the optimal taper design, numerical simulations with various structural parameters including taper tip size 124 and length 134 and slab taper tip size 128 and length 136 were performed.

Figure 2:
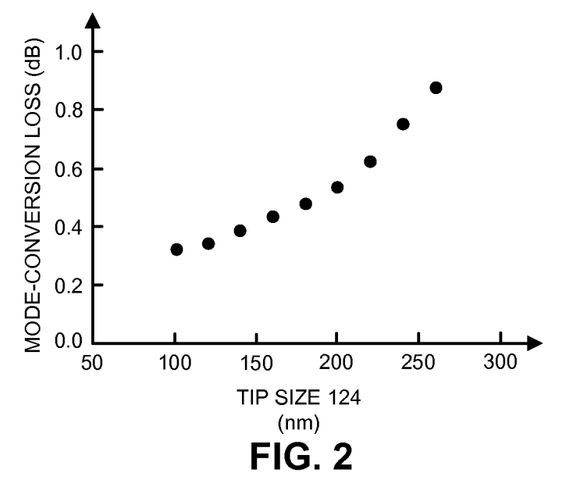
FIG. 2 is a drawing illustrating simulated mode-conversion loss of the optical mode converter of FIG. 1 as a function of the tip size in accordance with an embodiment of the present disclosure.

The numerical simulations used a semi-vectorial three-dimensional beam-propagation technique and calculated the mode-conversion loss in optical mode converter 100 between the submicron SOI optical waveguide mode and the expanded dielectric optical waveguide mode (in this case, a 3 µm mode size). Moreover, the overcladding dielectric layer 130 was silicon nitride, length 134 was 100 µm and length 136 was 100 µm. As shown in FIG. 2, which presents a drawing illustrating simulated mode-conversion loss of optical mode converter 100 (FIG. 1) as a function of the tip size 124 with slab tip size 128 of 180 nm (the feature-size available in a standard CMOS process), the mode conversion occurs smoothly without noticeable optical-coupling loss. Furthermore, the calculated conversion loss is 0.48 dB, which is a very similar result to that found with existing optical mode converters having tip size 124 less than 80 nm. These simulations indicate that the SOI taper can be realized with a standard CMOS process and also is expected to exhibit excellent fabrication tolerance (0.1 dB/±50 nm).

Figure 3:
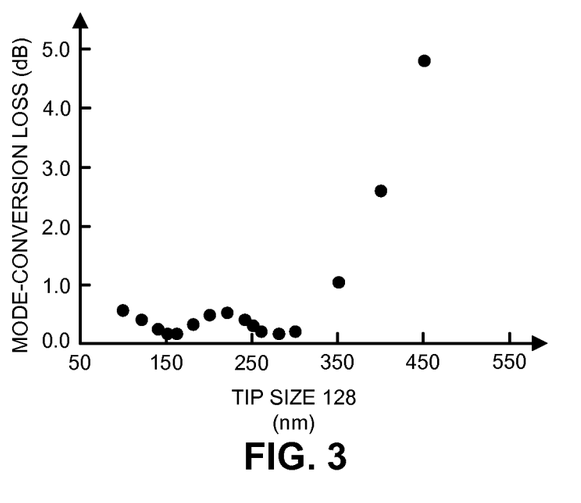
FIG. 3 is a drawing illustrating simulated mode-conversion loss of the optical mode converter of FIG. 1 as a function of the slab tip size in accordance with an embodiment of the present disclosure.

The effect of tip size 128 on the mode conversion loss was also investigated. This is shown in FIG. 3, which presents a drawing illustrating simulated mode-conversion loss of optical mode converter 100 (FIG. 1) as a function of slab tip size 128 with tip size 124 of 120 nm. When tip size 128 is less than 300 nm, the conversion loss is around 0.5 dB with excellent fabrication tolerance.

Note that the preceding simulations used a semiconductor-layer thickness of 300 nm. The optical mode converter can be used with different semiconductor-layer thicknesses (e.g., a thickness of 220 nm). In these embodiments, the rib-type optical waveguide may have a slab thickness less than 100 nm.

Figure 4:
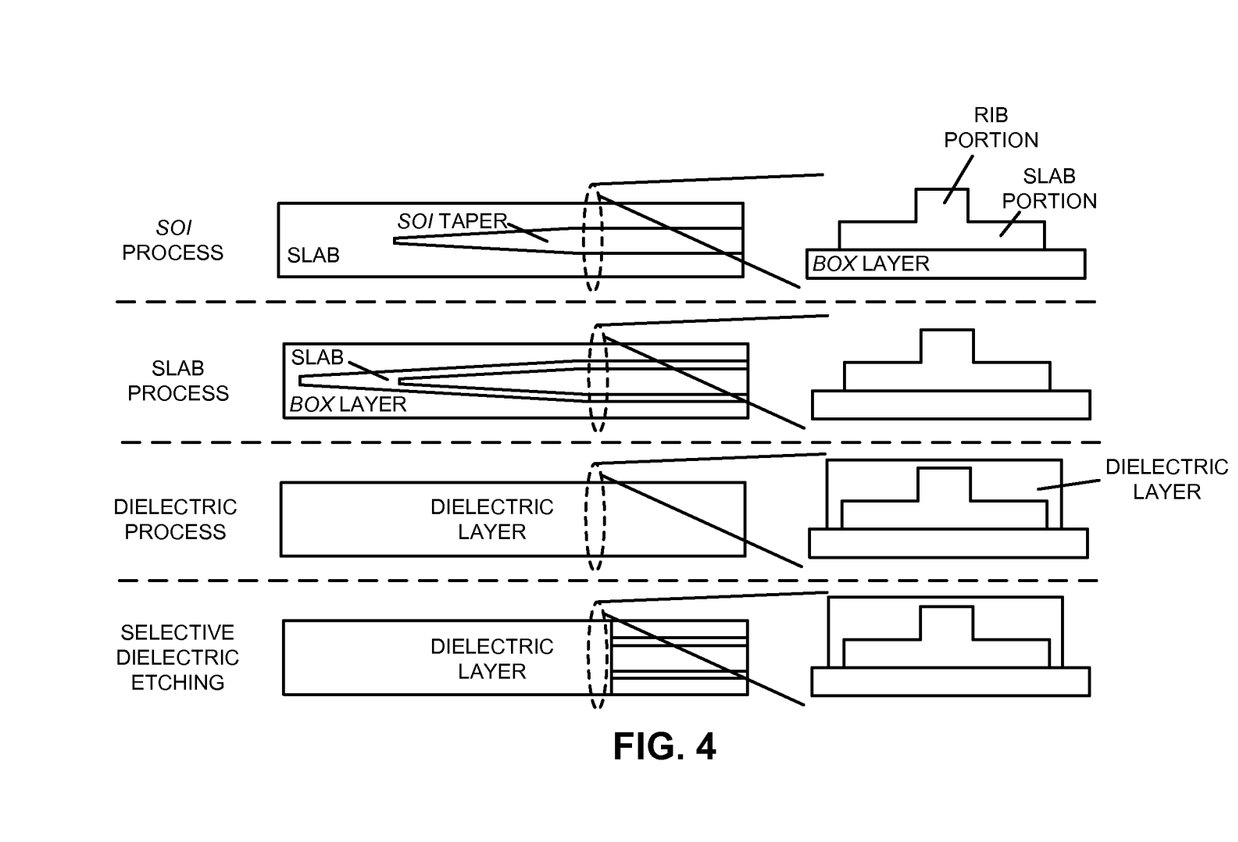
FIG. 4 is a drawing illustrating fabrication of the optical mode converter of FIG. 1 prior to metallization and dielectric-stacking fabrication operations in accordance with an embodiment of the present disclosure.

The optical mode converter may be fabricated before or after the back-end metallization and dielectric stacking. The former fabrication technique is illustrated in FIG. 4, which presents a drawing illustrating fabrication of optical mode converter 100 (FIG. 1) prior to metallization and dielectric-stacking fabrication operations. First, a partial silicon etch (e.g., 220 nm deep) may be performed to define the optical waveguides, passive devices (such as a filter, a grating, an optical coupler, etc.), active devices (such as an optical modulator, a detector, etc.) and the SOI taper. Then, the slab-mode region may be lithographically defined by a partial silicon etch (e.g., 80 nm deep). This second silicon partial etch may complete the multi-region inverse-taper structure. Moreover, a high-index dielectric layer (such as silicon oxynitride or silicon nitride) may be deposited on the entire surface and over the inverse-taper structure. Note that a thickness of the dielectric layer may match a desired mode size. Next, the dielectric optical waveguide may be photolithographically defined, and selective etching may be performed to form an overcladding dielectric optical waveguide. After fabrication of the optical mode converter, the rest of the standard CMOS process flow may occur.

Figure 5:
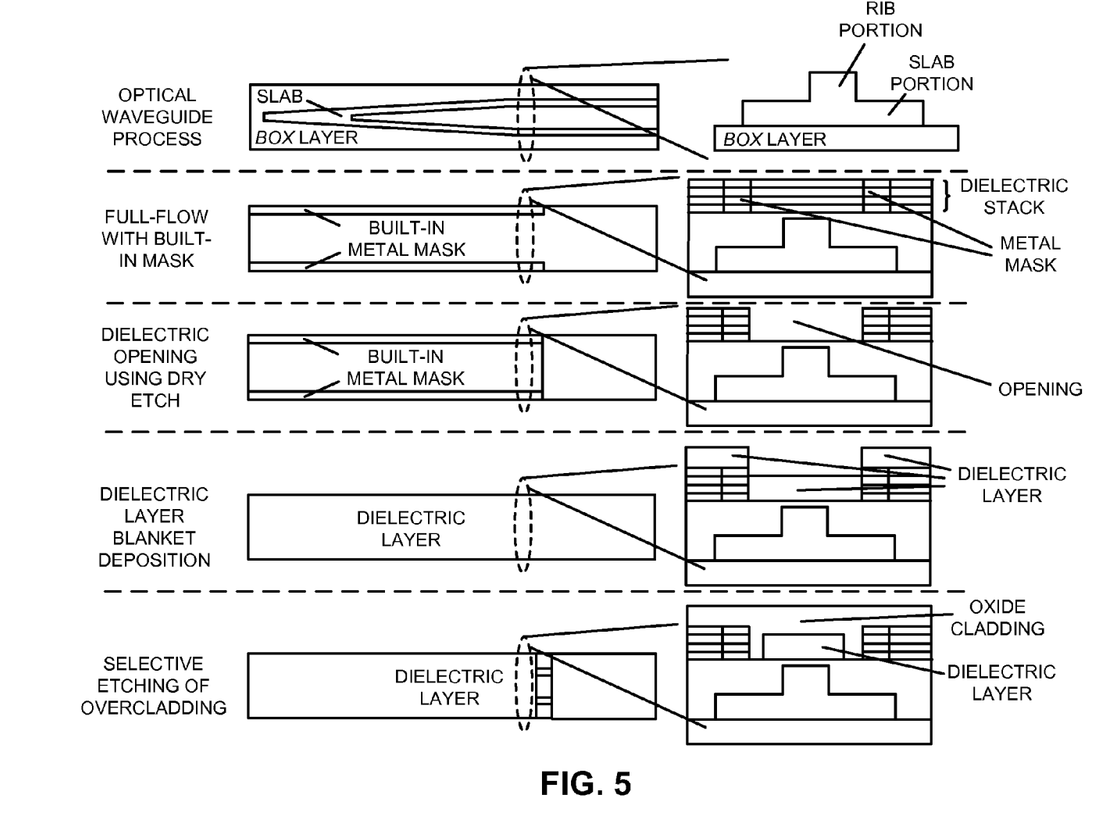
FIG. 5 is a drawing illustrating fabrication of the optical mode converter of FIG. 1 after metallization and dielectric-stacking fabrication operations in accordance with an embodiment of the present disclosure.

Alternatively, as shown in FIG. 5, optical mode converter 100 (FIG. 1) may be fabricated after metallization and dielectric-stacking fabrication operations (i.e., after the metal interconnects are defined in back-end processing). The inverse-taper structure may be processed during SOI optical waveguide formation in the same way as it was in FIG. 4, but the overcladding dielectric optical waveguide may be formed after the full-flow process is completed. Once the inverse-taper structure is formed during the silicon optical waveguide process, the remainder of the process may be compatible with standard CMOS processing. In order to ensure convenient and accurate fabrication of the dielectric optical waveguide, the dielectric stack on the top of the inverse-taper structure (where the overcladding optical waveguide is supposed to be located) may be metal free. Moreover, a built-in metal mask may be incorporated during the full-flow process as shown in FIG. 5, which can be defined using metal patterning in a CMOS process. In particular, a metal layer on the dielectric stack may be used as a built-in mask. This built-in mask may be adjacent to the dielectric layer along the direction transverse to the symmetry axis of the optical waveguide.

Then, using the built-in metal mask, the dielectric stack may be removed using dry etching. Furthermore, a high-index dielectric layer (such as silicon oxynitride or silicon nitride) may be blanket deposited and then may be selectively etched to form the overcladding dielectric optical waveguide. Additionally, a cladding layer (such as silicon dioxide) may be blanket deposited and the chip may be planarized using a chemical mechanical polishing technique. Note that the fabrication technique shown in FIG. 5 may involve fewer modifications to a standard CMOS process, which may reduce the complexity of the process integration in the foundry.

Figure 6:
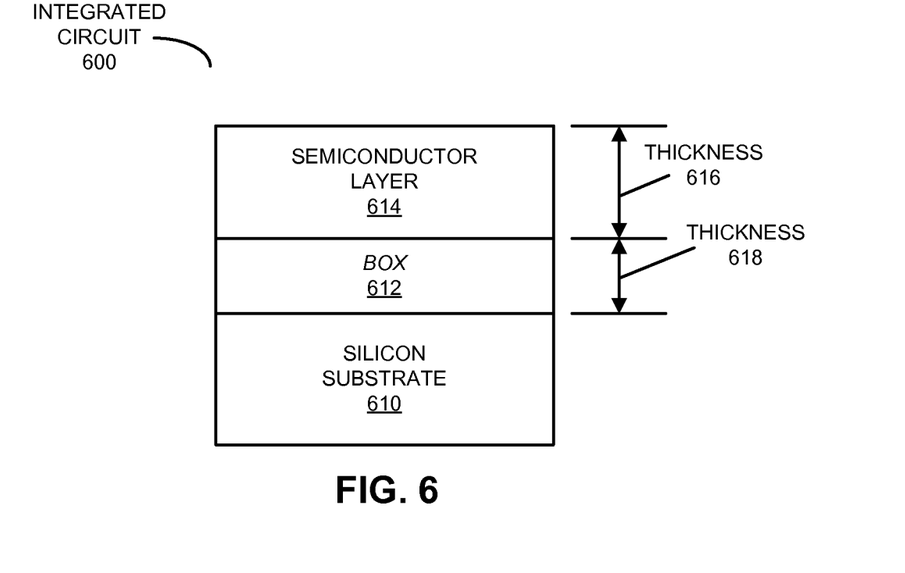
FIG. 6 is a block diagram illustrating an integrated circuit that includes the optical mode converter of FIG. 1 in accordance with an embodiment of the present disclosure.

As discussed previously, the optical mode converter may be implemented in an integrated circuit, such as a photonic integrated circuit. FIG. 6 presents a block diagram illustrating an integrated circuit 600. This integrated circuit includes: a substrate 610, a buried-oxide (BOX) layer 612 disposed on substrate 610, and a semiconductor layer 614 disposed on buried-oxide layer 612. Optical components in the optical mode converter may, at least in part, be included in buried-oxide layer 612 and semiconductor layer 614. In an exemplary embodiment, substrate 610 and semiconductor layer 614 include silicon and buried-oxide layer 612 includes silicon dioxide. Thus, substrate 610, buried-oxide layer 612 and semiconductor layer 614 may constitute a silicon-on-insulator technology.

Moreover, semiconductor layer 614 may have a thickness 616 that is less than 1 μm (such as 0.2-3 μm). Furthermore, buried-oxide layer 612 may have a thickness 618 between 0.3 and 3 μm (such as 0.8 μm). Note that a width of the optical waveguides may be 0.5-3 μm. In an exemplary embodiment, the optical waveguides convey an optical signal (i.e., light) having wavelengths between 1.1-1.7 μm, such as an optical signal having a fundamental wavelength of 1.3 or 1.55 μm.

Figure 7:
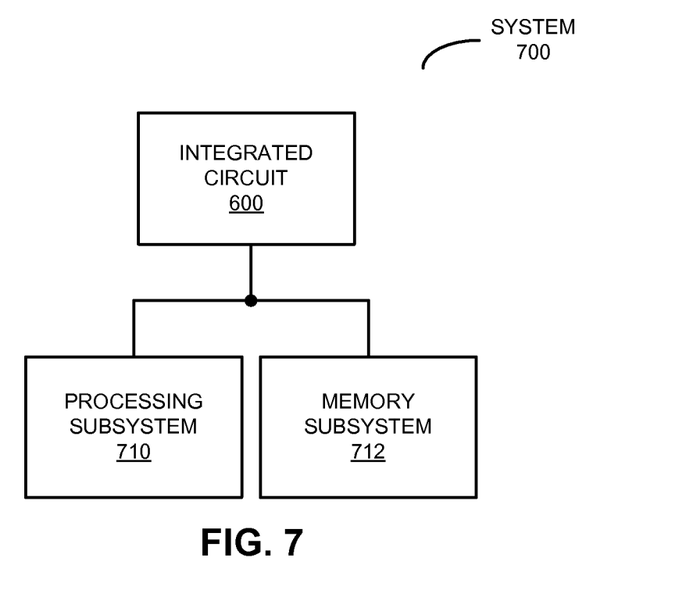
FIG. 7 is a block diagram illustrating a system that includes the integrated circuit of FIG. 6 in accordance with an embodiment of the present disclosure.

Integrated circuit 600 may be included in a system and/or an electronic device. This is shown in FIG. 7, which presents a block diagram illustrating a system 700 that includes integrated circuit 600. In some embodiments, system 700 includes processing subsystem 710 (with one or more processors) and memory subsystem 712 (with memory).

In general, functions of integrated circuit 600 and system 700 may be implemented in hardware and/or in software. Thus, system 700 may include one or more program modules or sets of instructions stored in a memory subsystem 712 (such as DRAM or another type of volatile or non-volatile computer-readable memory), which, during operation, may be executed by a processing subsystem 710. Note that the one or more computer programs may constitute a computer-program mechanism. Furthermore, instructions in the various modules in memory subsystem 712 may be implemented in: a high-level procedural language, an object-oriented programming language, and/or in an assembly or machine language. Note that the programming language may be compiled or interpreted, e.g., configurable or configured, to be executed by the processing subsystem.

Components in system 700 may be coupled by signal lines, links or buses. These connections may include electrical, optical, or electro-optical communication of signals and/or data. Furthermore, in the preceding embodiments, some components are shown directly connected to one another, while others are shown connected via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, system 700 may be at one location or may be distributed over multiple, geographically dispersed locations.

System 700 may include: a VLSI circuit, a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device. Note that a given computer system may be at one location or may be distributed over multiple, geographically dispersed locations.

Moreover, integrated circuit 600 can be used in a wide variety of applications, such as: optical communications (for example, in a transceiver, an optical interconnect or an optical link, such as for intra-chip or inter-chip communication), a radio-frequency filter, a bio-sensor, data storage (such as an optical-storage device or system), medicine (such as a diagnostic technique or surgery), a barcode scanner, and/or metrology (such as precision measurements of distance).

Furthermore, the embodiments of the optical mode converter, integrated circuit 600 and/or system 700 may include fewer components or additional components. Although these embodiments are illustrated as having a number of discrete items, these optical components, integrated circuits and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of the optical mode converter, integrated circuit 600 and/or system 700 may be implemented more in hardware and less in software, or less in hardware and more in software, as is known in the art.

While the preceding embodiments have been illustrated with particular elements and compounds, a wide variety of materials and compositions (including stoichiometric and non-stoichiometric compositions) may be used, as is known to one of skill in the art. Thus, while a silicon optical waveguide was illustrated in the preceding embodiments, the spot-size conversion technique may be used with other materials, as is known to one of skill in the art. Moreover, the semiconductor layer may include polysilicon or amorphous silicon. Furthermore, the materials and compounds in the optical mode converter may be fabricated using a wide variety of processing techniques, including: evaporation, sputtering, molecular-beam epitaxy, wet or dry etching (such as photolithography or direct-write lithography), polishing, etc. In addition, a wide variety of optical components may be used in or in conjunction with the optical mode converter.

Figure 8:
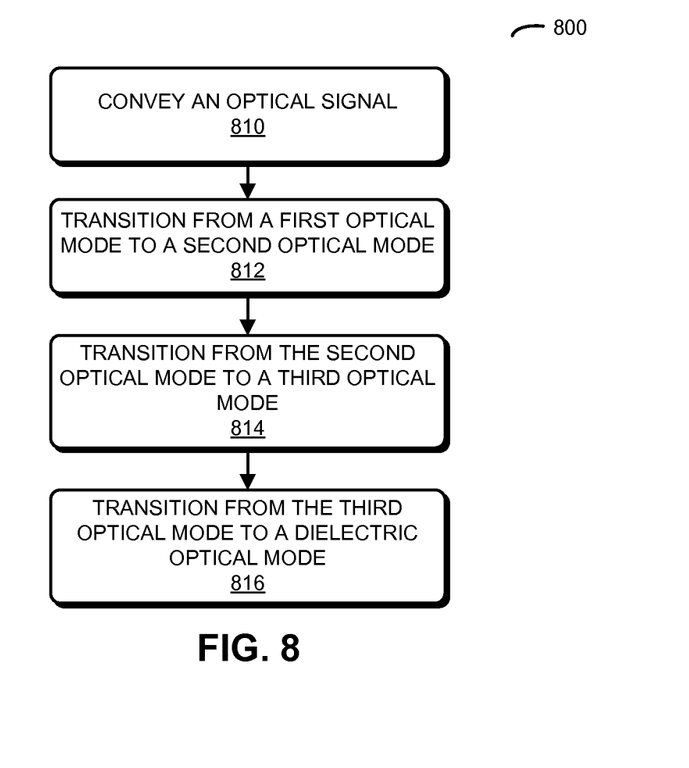
FIG. 8 is a flow chart illustrating a method for converting an optical spot size of an optical signal in accordance with an embodiment of the present disclosure.

We now describe embodiments of a method. FIG. 8 presents a flow chart illustrating a method 800 for converting an optical spot size of an optical signal, which may be performed using an optical mode converter (such as optical mode converter 100 in FIG. 1). During operation, the optical mode converter conveys, in a rib-optical-waveguide-mode region, the optical signal (operation 810) having a first optical mode in a rib-type optical waveguide defined by a rib portion and a slab portion in a semiconductor layer, where the semiconductor layer is disposed on a BOX layer and the BOX layer is disposed on a substrate, and where, in the rib-optical-waveguide-mode region, the slab portion has a width and the rib portion has a width. Then, the optical mode converter transitions, in a partial-slab-mode region adjacent to the rib-optical-waveguide-mode region, from the first optical mode to a second optical mode (operation 812) by decreasing the width of the slab portion and decreasing the width of the rib portion to a first minimum tip size.

Moreover, the optical mode converter transitions, in a slab-mode region adjacent to the partial-slab-mode region and that excludes the rib portion, from the second optical mode to a third optical mode (operation 814) by decreasing the width of the slab portion to a second minimum tip size. Next, the optical mode converter transitions, in a released-mode region adjacent to the slab-mode region and that excludes the slab portion, from the third optical mode to a dielectric optical mode (operation 816) in a dielectric layer disposed over the BOX layer.

In some embodiments of method 800, there may be additional or fewer operations. Moreover, the order of the operations may be changed, and/or two or more operations may be combined into a single operation.

Note that the optical mode converter may be used in a wide variety of applications, such as: communications, manufacturing (cutting or welding), a lithographic process, data storage (such as an optical-storage device or system), medicine (such as a diagnostic technique or surgery), a barcode scanner, entertainment (a laser light show), and/or metrology (such as precision measurements of distance).

In the preceding description, we refer to 'some embodiments.' Note that 'some embodiments' describes a subset of all of the possible embodiments, but does not always specify the same subset of embodiments.

What is claimed is:

1. An integrated circuit, comprising:
a substrate;
a buried-oxide (BOX) layer disposed on the substrate; and
a semiconductor layer disposed on the BOX layer, wherein, in a rib-optical-waveguide-mode region, an optical waveguide is defined by a slab portion in the semiconductor layer having a constant width along a direction transverse to a symmetry axis of the optical waveguide over a distance of the rib-optical-waveguide-mode region and a rib portion in the semiconductor layer having a constant width also along the direction transverse to the symmetry axis over a distance of the rib-optical-waveguide-mode region; and
wherein the integrated circuit includes an optical mode converter that includes:
a partial-slab-mode region, adjacent to the rib-optical-waveguide-mode region, in which the width of the slab portion decreases and the width of the rib portion decreases to a first minimum tip size;
a slab-mode region, adjacent to the partial-slab-mode region that excludes the rib portion, in which the width of the slab portion decreases to a second minimum tip size; and
a dielectric layer disposed on the substrate, wherein the dielectric layer is disposed over the slab portion, the rib portion and the BOX layer in the partial-slab-mode region, the slab portion and the BOX layer in the slab-mode region, and the BOX layer in a released-mode region adjacent to the slab-mode region that excludes the semiconductor layer.

2. The integrated circuit of claim 1, wherein the optical waveguide excludes a channel-type optical waveguide in the rib-optical-waveguide-mode region.

3. The integrated circuit of claim 1, wherein the first minimum tip size is greater than 180 nm.

4. The integrated circuit of claim 1, wherein the second minimum tip size is greater than 180 nm.

5. The integrated circuit of claim 1, wherein the dielectric layer includes one of: silicon dioxide, silicon oxynitride, silicon nitride, and a polymer.

6. The integrated circuit of claim 1, wherein lengths of the partial-slab-mode region and the slab-mode region are an order of magnitude greater than the width of the slab portion and the width of the rib portion.

7. The integrated circuit of claim 1, wherein a thickness of the dielectric layer is based on a desired mode size of the optical mode converter.

8. The integrated circuit of claim 1, wherein the optical mode converter is defined in the integrated circuit prior to metallization and dielectric-stacking fabrication operations.

9. The integrated circuit of claim 1, wherein the optical mode converter is defined in the integrated circuit after metallization and dielectric-stacking fabrication operations.

10. The integrated circuit of claim 1, wherein the integrated circuit includes a dielectric stack with a metal layer as a built-in mask adjacent to the dielectric layer along the direction.

11. A system, comprising:
a processor;
a memory, coupled to the processor, that stores a program module, which, during operation, is executed by the processor; and
an integrated circuit, comprising:
a substrate;
a buried-oxide (BOX) layer disposed on the substrate; and
a semiconductor layer disposed on the BOX layer, wherein, in a rib-optical-waveguide-mode region, an optical waveguide is defined by a slab portion in the semiconductor layer having a constant width along a direction transverse to a symmetry axis of the optical waveguide over a distance of the rib-optical-waveguide-mode region and a rib portion in the semiconductor layer having a constant width also along the direction transverse to the symmetry axis over a distance of the rib-optical-waveguide-mode region; and
wherein the integrated circuit includes an optical mode converter that includes:
a partial-slab-mode region, adjacent to the rib-optical-waveguide-mode region, in which the width of the slab portion decreases and the width of the rib portion decreases to a first minimum tip size;

a slab-mode region, adjacent to the partial-slab-mode region that excludes the rib portion, in which the width of the slab portion decreases to a second minimum tip size; and a dielectric layer disposed on the substrate, wherein the dielectric layer is disposed over the slab portion, the rib portion and the BOX layer in the partial-slab-mode region, the slab portion and the BOX layer in the slab-mode region, and the BOX layer in a released-mode region adjacent to the slab-mode region that excludes the semiconductor layer.

12. The system of claim 11, wherein the first minimum tip size and the second minimum tip size are greater than 180 nm.

13. The system of claim 11, wherein the dielectric layer includes one of: silicon dioxide, silicon oxynitride, silicon nitride, and a polymer.

14. The system of claim 11, wherein lengths of the partial-slab-mode region and the slab-mode region are an order of magnitude greater than the width of the slab portion and the width of the rib portion.

15. The system of claim 11, wherein a thickness of the dielectric layer is based on a desired mode size of the optical mode converter.

16. The system of claim 11, wherein the optical mode converter is defined in the integrated circuit prior to metallization and dielectric-stacking fabrication operations.

17. The system of claim 11, wherein the integrated circuit includes a dielectric stack with a metal layer as a built-in mask adjacent to the dielectric layer along the direction.

18. A method for converting an optical spot size of an optical signal, wherein the method comprises:

conveying, in a rib-optical-waveguide-mode region, the optical signal having a first optical mode in a rib-type optical waveguide defined by a rib portion and a slab portion in a semiconductor layer, wherein the semiconductor layer is disposed on the BOX layer and the BOX layer is disposed on a substrate, and wherein, in the rib-optical-waveguide-mode region, the slab portion has a constant width over a distance of the rib-optical-waveguide-mode region and the rib portion has a constant width over a distance of the rib-optical-waveguide;

transitioning, in a partial-slab-mode region adjacent to the rib-optical-waveguide-mode region, from the first optical mode to a second optical mode by decreasing the width of the slab portion and decreasing the width of the rib portion to a first minimum tip size;

transitioning, in a slab-mode region adjacent to the partial-slab-mode region that excludes the rib portion, from the second optical mode to a third optical mode by decreasing the width of the slab portion to a second minimum tip size; and transitioning, in a released-mode region adjacent to the slab-mode region that excludes the semiconductor layer, from the third optical mode to a dielectric optical mode in a dielectric layer disposed over the BOX layer.

19. The method of claim 18, wherein the dielectric layer includes one of: silicon dioxide, silicon oxynitride, silicon nitride, and a polymer.

20. The method of claim 18, wherein lengths of the partial-slab-mode region and the slab-mode region are an order of magnitude greater than the width of the slab portion and the width of the rib portion.

* * * * *

UNITED STATES PATENT AND TRADEMARK OFFICE
CERTIFICATE OF CORRECTION

PATENT NO.        : 9,575,251 B1
APPLICATION NO.   : 14/823954
DATED             : February 21, 2017
INVENTOR(S)       : Lee et al.

It is certified that error appears in the above-identified patent and that said Letters Patent is hereby corrected as shown below:

In the Claims

In Column 12, Line 11, in Claim 18, delete "waveguide;" and insert -- waveguide-mode region; --, therefor.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*